United States Patent
Ambartsoumian

(10) Patent No.: US 12,152,178 B2
(45) Date of Patent: *Nov. 26, 2024

(54) POLYMERIC TAPE WITH TEAR CUTS

(71) Applicant: Gourgen Ambartsoumian, Laval (CA)

(72) Inventor: Gourgen Ambartsoumian, Laval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,694

(22) Filed: Apr. 4, 2022

(65) Prior Publication Data

US 2022/0228040 A1 Jul. 21, 2022

Related U.S. Application Data

(63) Continuation of application No. 16/875,504, filed on May 15, 2020, now Pat. No. 11,319,464.

(Continued)

(51) Int. Cl.
*C09J 7/40* (2018.01)
*B32B 7/12* (2006.01)
(Continued)

(52) U.S. Cl.
CPC ............... *C09J 7/403* (2018.01); *B32B 7/12* (2013.01); *B32B 27/08* (2013.01); *C09J 7/203* (2018.01);
(Continued)

(58) Field of Classification Search
CPC ..... C09J 7/403; C09J 7/203; C09J 7/21; C09J 7/22; C09J 7/26; C09J 7/28; C09J 2301/10; C09J 2301/122; C09J 2301/18; C09J 2401/006; C09J 2483/00; C09J 2203/326; B32B 7/12; B32B 27/08; B32B 2405/00; B32B 3/02; B32B 7/06; B32B 15/043; B32B 15/09; B32B 15/12; B32B 2250/04; B32B 2250/44; B32B 2255/02; B32B 2255/06; B32B 2255/12; B32B 2262/062; B32B 2307/4026; B32B 2307/41; B32B 2307/412; B32B 2307/414; B32B 2307/416; B32B 2307/746; B32B 3/08; B32B 3/266; B32B 5/022; B32B 5/024; B32B 5/18; B32B 15/088; B32B 15/20; B32B 25/042; B32B 25/045; B32B 25/06; B32B 25/08; B32B 25/10; B32B 27/065; B32B 27/281; B32B 27/283;
(Continued)

(56) References Cited

U.S. PATENT DOCUMENTS

| | | |
|---|---|---|
| 2,030,135 A | 2/1936 | Carpenter |
| 2,142,194 A | 1/1939 | Karfiol |

(Continued)

FOREIGN PATENT DOCUMENTS

| | | |
|---|---|---|
| CA | 2789148 A1 | 8/2011 |
| CN | 1248899 A | 3/2000 |

(Continued)

*Primary Examiner* — Patricia L. Nordmeyer
(74) *Attorney, Agent, or Firm* — NORTON ROSE FULBRIGHT CANADA LLP

(57) ABSTRACT

A polymeric tape comprises a facestock extending lengthwise, the facestock including a polymer. An adhesive layer is on a first surface of the facestock. Tear-cuts are formed into at least one longitudinal edge of the facestock and extending inwardly, the tear-cuts being provided all along the at least one longitudinal edge of the facestock.

18 Claims, 14 Drawing Sheets

Related U.S. Application Data

(60) Provisional application No. 62/977,587, filed on Feb. 17, 2020, provisional application No. 62/964,183, filed on Jan. 22, 2020, provisional application No. 62/937,987, filed on Nov. 20, 2019.

(51) Int. Cl.
| | | |
|---|---|---|
| *B32B 27/08* | (2006.01) | |
| *C09J 7/20* | (2018.01) | |
| *C09J 7/21* | (2018.01) | |
| *C09J 7/22* | (2018.01) | |
| *C09J 7/26* | (2018.01) | |
| *C09J 7/28* | (2018.01) | |

(52) U.S. Cl.
CPC ............. *B32B 2405/00* (2013.01); *C09J 7/21* (2018.01); *C09J 7/22* (2018.01); *C09J 7/26* (2018.01); *C09J 7/28* (2018.01); *C09J 2301/10* (2020.08); *C09J 2301/122* (2020.08); *C09J 2301/18* (2020.08); *C09J 2401/006* (2013.01); *C09J 2483/00* (2013.01); *Y10T 428/1476* (2015.01)

(58) Field of Classification Search
CPC ..... B32B 27/302; B32B 27/308; B32B 27/36; B32B 29/005; B32B 2255/10; B32B 2307/518; B32B 2307/582; B32B 2307/748; B32B 2307/75; B32B 5/245; B32B 5/26; B32B 15/085; B32B 25/14; B32B 27/12; B32B 27/304; B32B 27/32; B32B 2250/03; B32B 2255/24; B32B 2307/7163; B32B 5/32; B32B 2307/732; B32B 15/046; B32B 15/06; B32B 15/08; B32B 15/082; B32B 15/14; B32B 25/20; B32B 27/10; B32B 27/34; B32B 29/007; B32B 29/02; Y10T 428/1476
See application file for complete search history.

(56) References Cited

U.S. PATENT DOCUMENTS

| | | | |
|---|---|---|---|
| 2,399,545 | A | 4/1946 | Davis |
| 2,508,855 | A | 5/1950 | Brown |
| 2,633,440 | A | 3/1953 | Scholl |
| 2,636,297 | A | 4/1953 | Johnson |
| 3,143,208 | A | 8/1964 | Sizemore, Jr. |
| 3,869,333 | A | 3/1975 | McMaster |
| 4,562,102 | A | 12/1985 | Rabuse et al. |
| 5,312,680 | A | 5/1994 | Simpson |
| 5,370,916 | A | 12/1994 | Olsen |
| 5,496,605 | A | 3/1996 | Augst et al. |
| 5,525,390 | A | 6/1996 | Yang |
| 5,770,288 | A | 6/1998 | Carney, Jr. |
| 5,782,496 | A | 7/1998 | Casper et al. |
| 5,858,155 | A | 1/1999 | Hill et al. |
| 6,018,092 | A | 1/2000 | Dunshee |
| 6,210,768 | B1 * | 4/2001 | Blok ............... B65H 37/005 206/409 |
| 6,238,762 | B1 | 5/2001 | Friedland et al. |
| 6,403,188 | B1 | 6/2002 | Donahue |
| 6,451,154 | B1 | 9/2002 | Grabau et al. |
| 6,541,089 | B1 | 4/2003 | Hamerski et al. |
| 6,756,102 | B1 | 6/2004 | Galo |
| 7,790,259 | B2 | 9/2010 | Wu et al. |
| 9,643,202 | B2 | 5/2017 | Sackler |
| 10,766,101 | B2 | 9/2020 | Rambusch et al. |
| 10,844,249 | B2 | 11/2020 | Liu et al. |
| 11,319,464 | B2 * | 5/2022 | Ambartsoumian ... B32B 15/085 |
| 2003/0152732 | A1 | 8/2003 | Donahue |
| 2004/0202820 | A1 | 10/2004 | Bharti |
| 2006/0172103 | A1 | 8/2006 | Chang |
| 2007/0009697 | A1 | 1/2007 | Silva et al. |
| 2007/0014956 | A1 | 1/2007 | McCarthy |
| 2007/0218234 | A1 | 9/2007 | Wu et al. |
| 2007/0218235 | A1 | 9/2007 | Wu et al. |
| 2008/0038501 | A1 | 2/2008 | Velasquez Urey et al. |
| 2008/0041524 | A1 | 2/2008 | McCarthy |
| 2008/0145586 | A1 | 6/2008 | Kawada et al. |
| 2010/0224312 | A1 | 9/2010 | Tsubaki et al. |
| 2010/0276056 | A1 | 11/2010 | Traboulsi |
| 2011/0200779 | A1 | 8/2011 | Wolfe |
| 2012/0027975 | A1 | 2/2012 | La Velle |
| 2012/0082815 | A1 | 4/2012 | Dehlinger et al. |
| 2012/0114891 | A1 | 5/2012 | Smith |
| 2012/0125986 | A1 | 5/2012 | Walton |
| 2014/0363605 | A1 | 12/2014 | Ogawa |
| 2016/0174643 | A1 | 6/2016 | Miller et al. |
| 2017/0337852 | A1 | 11/2017 | Oster |
| 2019/0282406 | A1 | 9/2019 | Ambartsoumian |

FOREIGN PATENT DOCUMENTS

| | | |
|---|---|---|
| CN | 1995253 A | 7/2007 |
| CN | 101501155 A | 8/2009 |
| CN | 101838507 A | 9/2010 |
| CN | 102802715 A | 11/2012 |
| CN | 105451586 A | 3/2016 |
| CN | 109749649 A | 5/2019 |
| JP | S47037857 | 12/1972 |
| JP | S54084356 | 6/1979 |
| JP | H04018638 | 2/1992 |
| JP | H06073140 U | 10/1994 |
| JP | H71053 U | 1/1995 |
| JP | H08283676 | 10/1996 |
| JP | 3042997 | 11/1997 |
| JP | 3043161 | 11/1997 |
| JP | H10219205 | 8/1998 |
| JP | 2013031524 | 2/2013 |
| JP | 2018053022 | 4/2018 |
| KR | 100795949 B1 | 1/2008 |
| WO | 2015021294 A1 | 2/2015 |
| WO | 2019/217179 A1 | 11/2019 |
| WO | 2019217179 | 11/2019 |

* cited by examiner

POLYMERIC TAPE WITH TEAR CUTS

CROSS-REFERENCE TO RELATED APPLICATION

The present application is a continuation of U.S. patent application Ser. No. 16/875,504, filed on May 15, 2020, which claims the priorities of U.S. Patent Application No. 62/977,587, filed of Feb. 17, 2020; of U.S. Patent Application No. 62/964,183, filed on Jan. 22, 2020; and of U.S. Patent Application No. 62/937,987, filed on Nov. 20, 2019, the contents of which are incorporated herein by reference.

TECHNICAL FIELD

The present application relates to a polymeric tape of the type commonly found in rolls, and used for example as a marking tape, and to a method of using polymeric tape.

BACKGROUND OF THE INVENTION

Polymeric tape is commonly used for a wide spectrum of applications such as labelling, wrapping, packaging, sealing, masking, sticking to a surface, color-coding, etc. Such applications may be for various industries including medical, biomedical, industrial, electrical, electronic, construction, automotive, avionics, aerospace, scientific. Polymeric tape typically has a facestock having the capacity of retaining ink. Accordingly, information may be inscribed on the facestock marking tape to label things. In particular, polymeric marking tape, in which the substrate is a polymer, is used for its capacity to retain ink. Other types of tapes are used for sealing, securing or isolating objects such as electrical tape, packaging tape, duct tape, silicone tape, and others where facestocks in some of those tapes might not need to have a capability to retain ink. Yet in other applications tapes might be used for sticking together objects or surfaces, such as double-sided tapes which might not require capacity of retaining ink or such as an adhesive transfer tape where the adhesive is contained between two support liners for a future removal of one of the support liners and the transfer of the adhesive to a facestock.

A characteristic of some polymers is that they may stretch when subjected to shear forces. Therefore, if a user wants to have a segment of an elongated polymeric tape, such as in a roll of polymeric tape, the user may need scissors or a knife to cleanly segment a portion of the polymeric tape from the roll. Otherwise, by using manual force to rip or tear tape from a roll, a user may unduly stretch the tape, which may result in waves, loss of adherence, erratic shape, excessive length, among other things. In some cases, the polymeric films are rigid and tear-resistant making them difficult to tear manually.

SUMMARY OF THE INVENTION

It is an aim of the present disclosure to provide a polymeric tape that addresses issues related to the prior art.

Therefore, in accordance with the present disclosure, there is provided a polymeric tape comprising: a facestock extending lengthwise, the facestock including at least a polymer, an adhesive layer on a first surface of the facestock, and tear-cuts formed into at least one longitudinal edge of the facestock and extending inwardly, the tear-cuts being provided all along the at least one longitudinal edge of the facestock.

BRIEF DESCRIPTION OF THE EMBODIMENTS

Figure 1A:
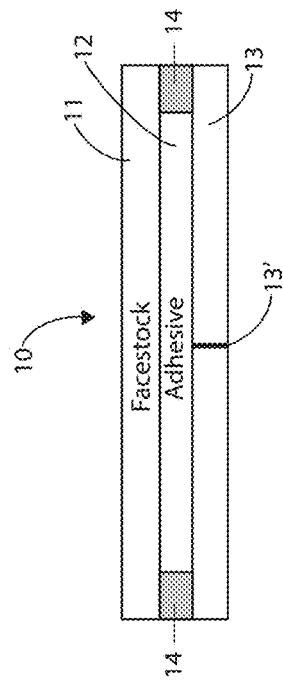
FIGS. 1A-1P are schematic sectional views of a polymeric tape in accordance with embodiments of the present disclosure.

Referring to the drawings and more particularly to FIGS. 1A-1I, a polymeric tape in accordance with a first embodiment of the present disclosure is generally shown at 10. The polymeric tape 10 may be an elongated strip of tape or may be part of a roll. The polymeric tape 10 may be of the type that may be used to manually inscribe information thereon. The tape roll 10 may also be of the type used by a printer. Some printers such as thermal printers are equipped with a cutting mechanism which is a sharp knife that moves perpendicular to the feeding direction of the printer and segments the desired length of the tape. Other devices such as tape dispensers are also equipped with cutting, dispensing and in some cases peeling mechanisms. Although the tape 10 is primarily intended for manual cutting we contemplate the possibility that the tape 10 can be also cut, dispensed and/or peeled using various types of cutters incorporated into printers, mechanical or electrical dispensers and automation or robotic devices.

The polymeric tape 10 may have various layers, all of which may extend from end to end of the polymeric tape 10, i.e., along a lengthwise direction projecting out of the page of FIGS. 1A-1I. Facestock 11 is the surface that can accept ink or printing, although the capability of accepting ink is not a requirement. This may include printing using a thermal printer, a thermal-transfer printer, a direct-thermal printer, a laser printer, an inkjet printer, LED printer, UV printer, impact printer, dot-matrix printer, laser-etching printer, flexographic printer, offset printer or a printing press or any other type of printer or device capable of delivering ink on any of the surfaces of the tape. The facestock 11 itself may include one or more layers, including transparent and opaque layers, shielding layer(s), top coatings, inks, varnishes, laminations, wireless communication capabilities such as RFID (Radio Frequency Identification), NFC (Near Field Communication), Bluetooth and other types of wireless communication tags or a chip, sensor, electronic component, etc. The polymeric tape can be provided blank or printed with any background color or color indicator such as thermochromic ink, and/or image, and/or information and/or barcode and/or alphanumeric markings, and/or indicia etc. The facestock materials can be made of a polymer. The facestock material(s) may include but are not limited to polymers such as polypropylene, biaxially oriented polypropylene (BOPP), polyester (PET), polystyrene, vinyl including polyvinyl chloride (PVC) and polyvinyl fluoride (PVF), acrylate, nylon, satin, polyolefin, polyethylene, polyimide, tyvek, composite materials, silicone, silicone rubber, rubber, synthetic rubber, latex thermoplastic films, thermoset plastics, plastic extrusion materials, and may also include cloth tissues, woven or non-woven fabrics, foam, metallic foils such as aluminum foil, Velcro, degradable and soluble materials including biodegradable materials. The facestock materials include paper and polymer composites or combinations, cloth and polymer composites or combinations, including layers of polymer and paper and/or cloth, such that the paper or cloth is for example laminated with plastic. The tape 10 may be tamper evident and/or destructible tape, "destructible" meaning that the tape can break into pieces or fragments upon attempt to remove it from the substrate that it has been adhered. Some tamper evident features might include specific cuts and/or perforations within the facestock making it fragile and causing tape rupture upon attempts to remove it after applying the adhesive tape to a substrate or a container. There are other types of tamper evident materials that can reveal the tampering and the tape 10 may be made from such materials. Embossed, stamped foil, clear, opaque, transparent, translucent and/or reflective materials may also be used for the facestock 11. The polymers may be thermoplastics or thermosoftening plastics, i.e., plastic polymers that soften or become moldable when heated to a certain threshold temperatures, to solidify upon cooling. The polymers may be thermoset plastics comprising cross-linked polymers to form an irreversible chemical bond and may become non-moldable when heated. The facestock 11 may be selected to have direct thermal printing capacity meaning that ink is incorporated inside the facestock 11 or in its top coating. The ink may then be released upon heating the facestock layer 11 such as by a thermal printer or a heat-emitting or heated instrument. The facestock 11 may be for example printed with a reversible or a non-reversible thermochromic ink which may also be also incorporated inside the facestock or other constituent of the tape 10 such as inside the lamination or inside the adhesive. The use of a combination of printing methods is contemplated. All tapes 10 of the present disclosure may or may not accept writing by a pen, pencil, marker or any other instrument for manual writing.

Figure 1B:
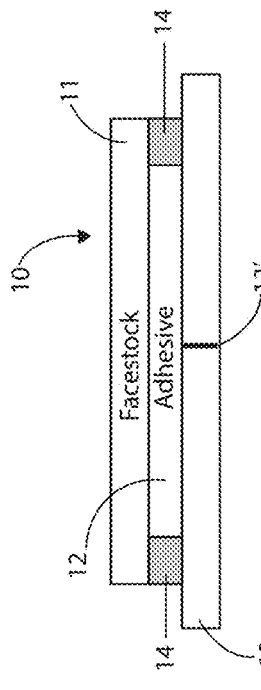
Figure 1C:
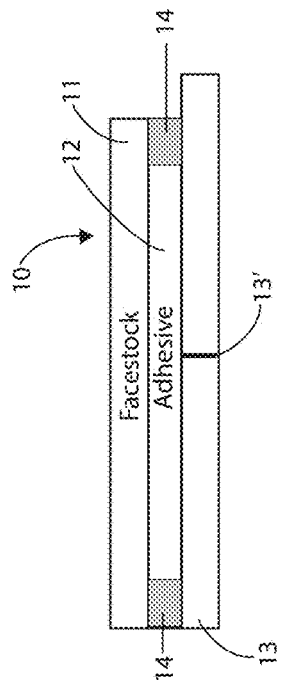

An adhesive layer 12 may be coated on the underside of the facestock 11. A first support liner or release liner 13 may also be provided, from which the adhesive layer 12 with the facestock 11 can be released. In another embodiment, the polymeric tape 10 may be linerless and wound on itself, such that the adhesive layer 12 adheres to the top surface of the facestock 11 from which it can be released. The release liner 13 may be paper based, or polymer based, with contemplated polymers including a polyester (PET), polypropylene, bi-axially oriented polypropylene (BOPP) or any other type of a polymer. For example, the release liner 13 may be a silicone or fluorosilicone coated support on which the adhesive layer 12 is harboured or retained, though other materials can be used, including waxes or other adhesive release coatings, etc, on a substrate. For example, if the support liner 13 is paper based, a low friction coating may be present to facilitate the peeling off of the facestock 11 and adhesive layer 12 from the support liner 13. Accordingly, when the release liner 13 is removed, the facestock 11 may be adhered to a surface, by the adhesive layer 12. In an embodiment, the facestock 11 relies on static cling as an alternative to having the adhesive layer 12. In another embodiment, the release liner 13 may have imaging properties meaning that the manual writing with a pen or a pencil or with any type of impact instrument or impact printer can create a copy of the image on the release liner 13. In this case, when the facestock 11 is removed from the liner 13, the copy of the printed information or the image remains on the release liner 13 similar to carbon-copying. In another embodiment, if the tape 10 has a paper facestock 11 and a polymeric release liner 13, the polymeric liner 13 will prevent the clean tearing of the tape 10, whereby the micro tear-cuts 20 as described below into the liner 13 will facilitate the tearing. In FIG. 1A, the liner 13 is shown having the same width W1 as the facestock 11 and as the adhesive layer 12. In FIGS. 1B and 1C, the liner 13 has a width that is greater than W1 such that the liner 13 extends beyond the facestock 11 widthwise, at one edge of the facestock 12 (FIG. 1C), or at both edges of the facestock 12 (FIG. 1B). By way of example, the polymeric tape 10 may have a width W1 of at least 4.0 mm. In an embodiment, the dimension W1 is 12 mm±6 mm. In another embodiment the dimension W1 is 19 mm±9 mm. In another embodiment the dimension W1 is between 25 mm and 70 mm. In another embodiment the dimension W1 is between 70 mm and 110 mm. These dimensions are given as examples.

Optionally, an undercut 13' may be defined in the liner 13 and may extend lengthwise. The undercut 13' may also be referred to as a slit, as a through-cut, etc. In an embodiment, the undercut 13' does not cut into the facestock 11 (it may leave a mark). The undercut 13' may facilitate the peeling off of the liner 13 from the facestock 11.

Figure 1D:
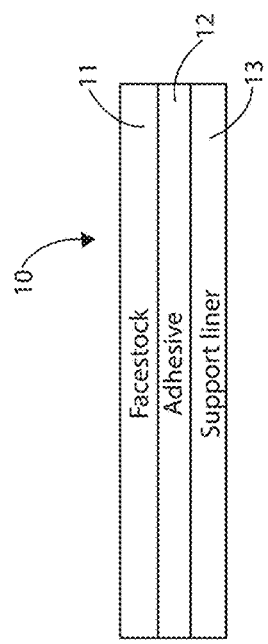
Figure 1E:
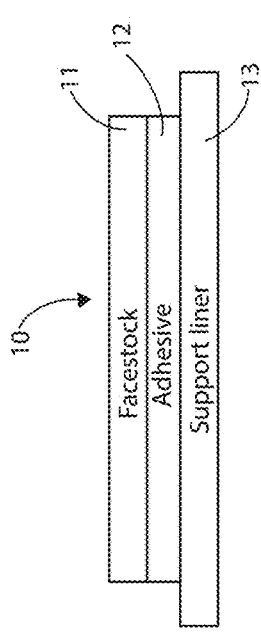
Figure 1F:
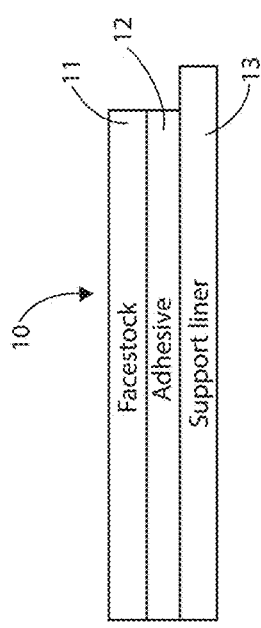

As shown in FIGS. 1D to 1F, it is contemplated to add neutralized adhesive zones 14 on along one or both edges of the facestock 11. The neutralized adhesive zones 14 can be defined by the adhesive layer 12 being exposed to a neutralizing agent in these zones 14. In an embodiment, the neutralizing agent is used during production by lifting the facestock 11 with adhesive 12 from the support liner 13, applying the neutralizing agent and re-laminating the facestock 11 onto the support liner. As a result the adhesive 12 in zone 14 may lose or significantly diminish its adhesion properties. Regardless of when or how it is applied, the neutralizing agent operates to reduce or eliminate (i.e. "neutralize") the adhesive effect of the adhesive 12 along the edges of the facestock 11, in the zones 14. This reduces the peel strength of the facestock 11 only along its edge(s), and thus may facilitate peeling off facestock 11 from the liner 13. The neutralizing agent may be any suitable material to achieve such functionality. Non-limiting examples of the neutralizing agent include liquid solvents, such as varnishes (e.g. water-based, solvent-based, ultraviolet, LED UV, urethane, etc.), and inks (e.g. urethane, flexographic, UV, LED UV or other types of printing inks). The neutralizing agent may also be another chemical applied in liquid or solid form. The neutralizing agent can be applied using a printing plate to print along the adhesive side of the tape 10. In an embodiment, a patterned adhesive may be applied excluding the zone 14, such that instead of neutralizing the existing adhesive the zone 14 may simply be without adhesive.

Figure 1G:
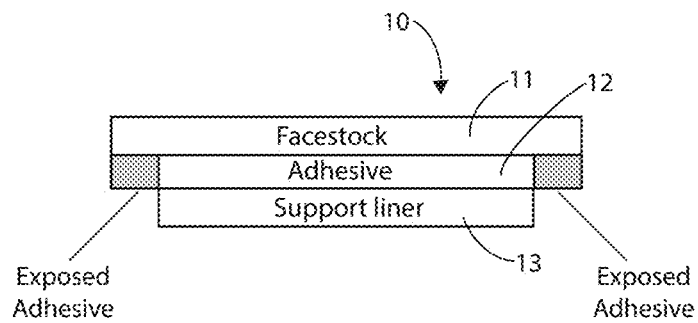
Figure 1H:
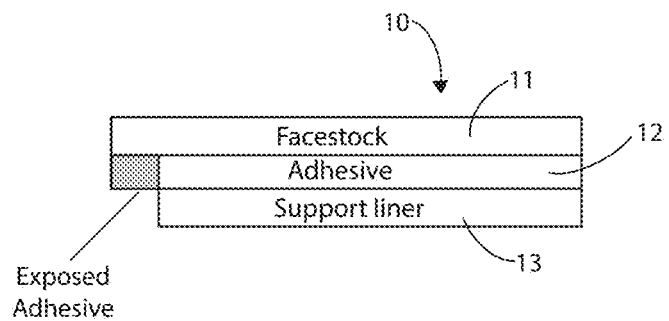
Figure 1I:
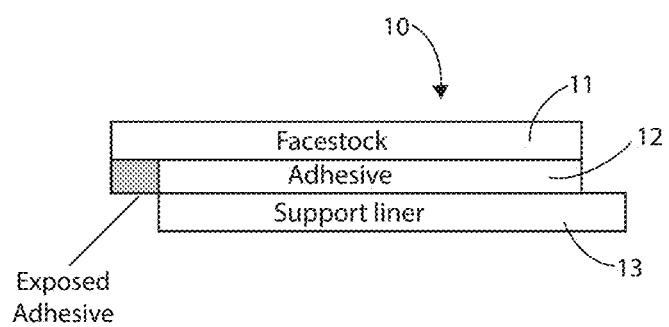
Figure 1J:
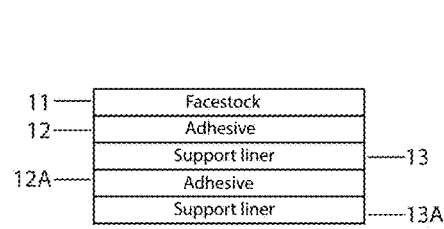
Figure 1K:
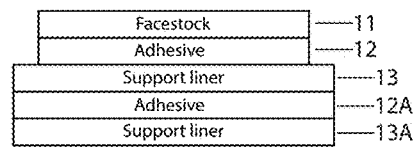
Figure 1L:
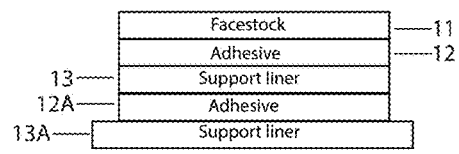
Figure 1M:
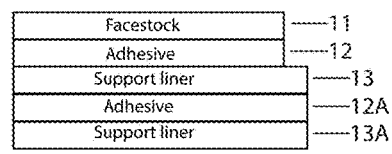
Figure 1N:
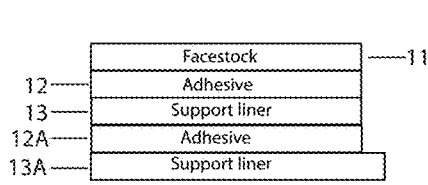
Figure 1O:
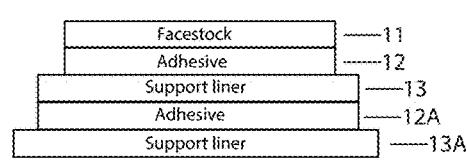
Figure 1P:
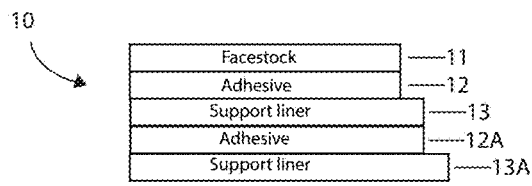

Referring to FIGS. 1G-1I, in various embodiments the support liner 13 may be narrower than the facestock 11 and adhesive layer 12. This may be at both longitudinal edges of the tape 10 as in FIG. 1G, or on a single side as in FIGS. 1H and 1I. There results a narrow strip of adhesive that may be exposed, for adherence to the facestock 11 under it when the tape 10 is in a roll or coil. The exposed adhesive strip may help keeping the tape 10 in the roll and prevent unwinding and/or wobbling from side-to side.

In another embodiment, show with reference to FIGS. 1J-1P, the tape 10 may have a piggy-back construction that includes a secondary release liner 13A which is attached to the liner 13 through another adhesive layer 12A. The liners 13 and/or 13A may be an imaging liner meaning that markings made on the facestock 11 can be transferred to the liner 13 and/or 13A and have the image of the writings left on the release side or siliconized side of the liner 13 and/or 13A. Such examples of writings can be a writing with a pen, pencil, marking pen, impact printer, typewriter or a similar device that creates strong enough impact able to create an image on the imaging liner 13 and/or 13A underneath.

FIGS. 1A to 2D are schematic and may not be to scale. Although other thicknesses are possible, some exemplary thicknesses are now given to define one contemplated embodiment. The thickness of the facestock 11 may be between 0.4 mil and 40 mil. In an embodiment featuring porous or spongy materials such as foam, the thickness of the facestock may be more than 40 mils. The thickness of the support liner 13 may be between 0.4 mil and 20 mils.

Figure 2A:
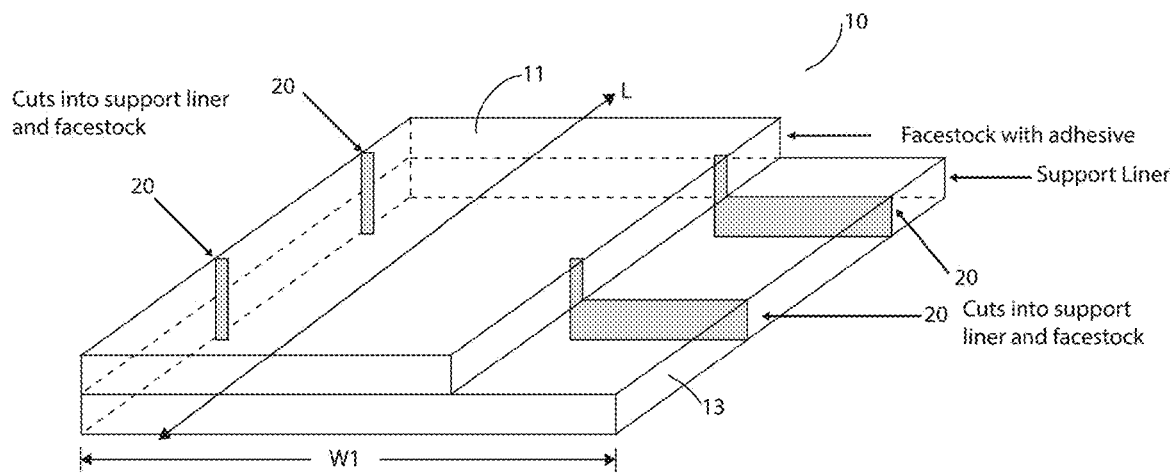
FIGS. 2A-2D are schematic sectional views of the polymeric tape in accordance with embodiments of the present disclosure.
Figure 2B:
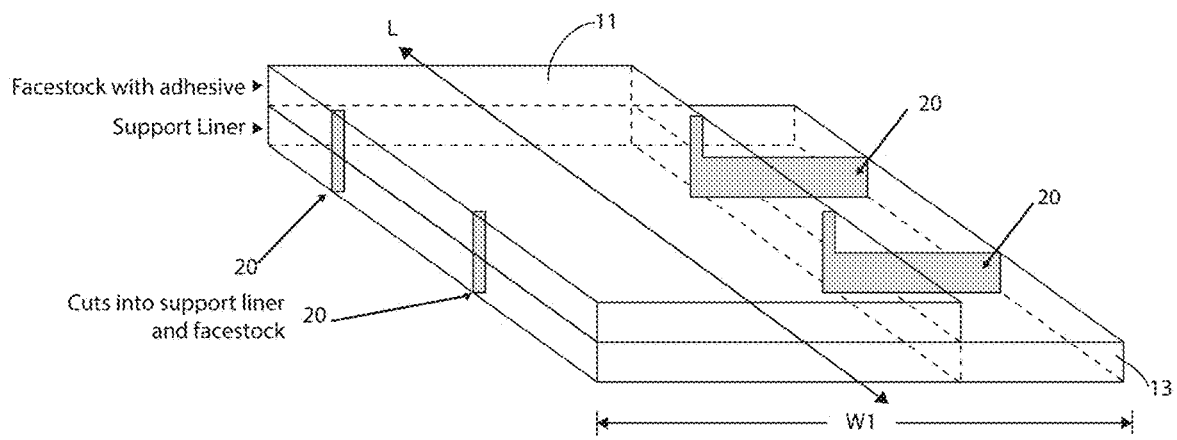

Referring to FIGS. 2A to 2D, the polymeric tape 10 is shown at least partially lengthwise, as extending in direction L. Only a segment of the polymeric tape 10 is shown, as the polymeric tape 10 may extend far longer in the direction L. The polymeric tape 10 is shown as having micro tear-cuts 20 transverse to the longitudinal (i.e., lengthwise) dimension of the polymeric tape 10, and this may be referred to as a widthwise direction, for example as shown by W1. The expression "micro" is used to indicate that the tear-cuts are thin to the point that they may not even be visible. For example, the penetration of the cuts in the facestock 11 may be in the micro scale, and may be as low as 0.01 mm. The micro tear-cuts 20 start from one or both of the elongated edges of the polymeric tape 10 and extend into the facestock 11 and/or the support liner 13, i.e., the penetration. Penetration refers to the length of the tear-cuts 20 from the edge of the tape 10 or liner 13. In an embodiment, the penetration is from 0.01 mm to 3.00 mm. It is contemplated that the penetration could be less than 0.01 mm provided suitable technology enables such penetration. The cuts into support liner can be significantly longer and cover the entire edge of the exposed support liner. The micro tear-cuts 20 do not extend from edge to edge of the facestock of the polymeric tape 10, with the micro tear-cuts 20 extending inwardly enough to reach the facestock 11. In FIGS. 2A and 2B, it is shown that the tear-cut 20 in the facestock 11 extends into a tear-cut 20 in the support liner 13. Stated differently, a tear cut 20 may be made into the support liner 13, and may extend all the way to the facestock 11. For example, such common tear-cut 20 is made with a single tooling maneuver.

In another embodiment, there may a perforation or multiple perforations 20', also referred to as micro-perforations, into the support liner 13. The perforations 20' may be perpendicular to the unwinding direction of the tape 10 when in a roll, allowing a more controlled tearing of the tape. Such perforations 20' into the support liner 13 may be aligned with or be between the micro-cuts 20 or may be between only some of them. The perforations 20' may be round in shape, though any other shape is considered. In another embodiment, there may a perforation 20' or multiple perforations 20' into the support liner 13 parallel to the unwinding direction of the tape 10 when in a roll, allowing a more controlled tearing of the tape 10. The micro-perforations 20' can be small dots or needle-holes or small cuts in a string or line, the micro-perforations 20' being close to each other to help cut the desired size segments of the tape 10. Furthermore, the micro-perforations 20' of any shape or form can be aligned with the tear cuts 20 of any shape or form to facilitate the manual cutting or segmenting the tape 10. In an embodiment, the micro-perforations 20' do not perforate through the support liner 13. Instead, micro-embossings are formed in the support liner 13, and may weaken the support liner 13 to faciliate its tearing along the micro-embossings.

Figure 2C:
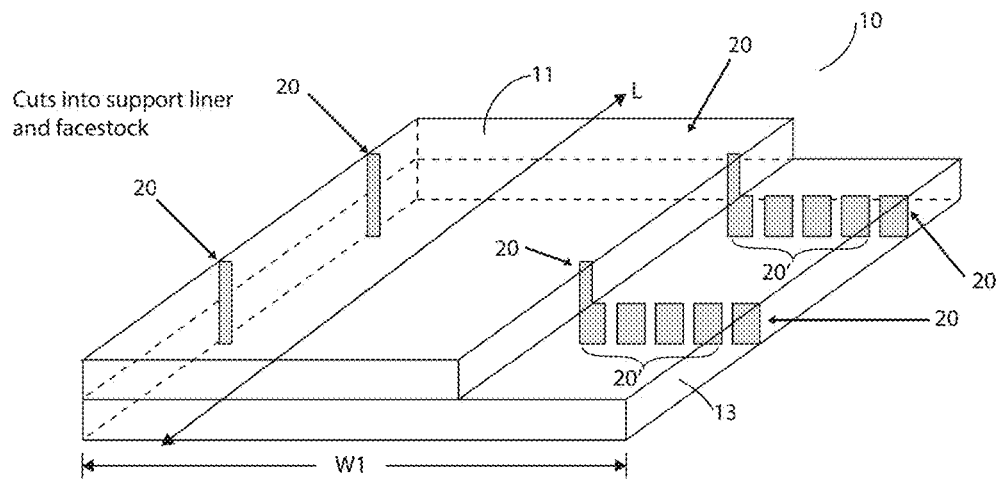
Figure 2D:
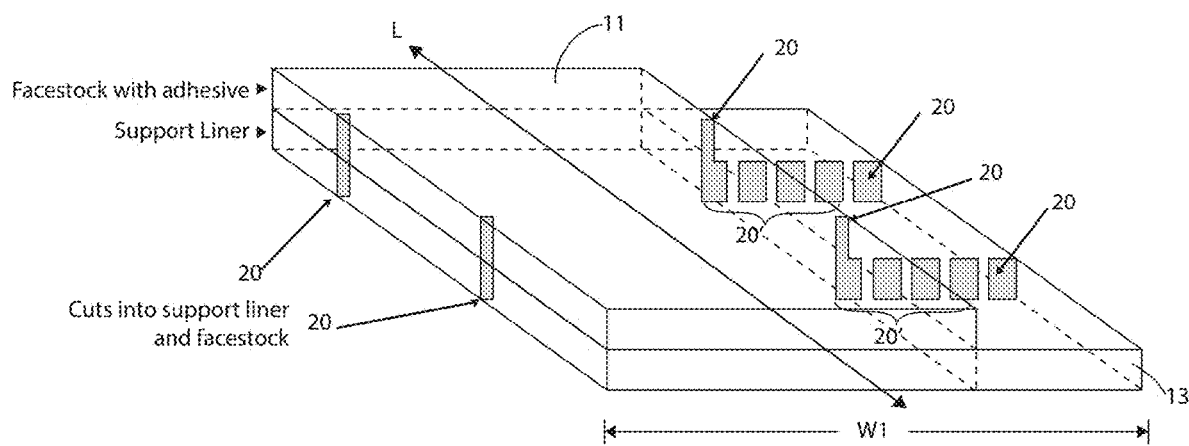

Referring to FIGS. 2C and 2D, an exemplary embodiment shows a combination of tear cuts 20 and perforations 20'. A tear cut 20 is formed into the support liner 13. Perforations 20' are in line with the tear cut 20 and extend widthwise. One such perforation 20' communicates with a tear cut 20 in the facestock 11. Therefore, a user may tear the support liner 13 as guided by the tear cut 20. The perforations 20' aligned with the tear cut 20 direct the tear to the tear cut 20 in the facestock 11.

The micro tear-cuts 20 may be present in the polymeric tape 10 of any one of FIGS. 1A to 2D. Moreover, in a configuration in which the support liner 13 is wider than the facestock 11 and extends beyond it (e.g., FIGS. 1B and 1C), the micro tear-cuts 20 may extend from the lateral edge of the polymeric tape 10 defined by the support liner 13, and extend continuously into the facestock 11, as shown in FIGS. 2A and 2B. The micro tear-cuts 20 may be interrupted, and followed up by perforations 20'. This may be found in a polymeric tape 10 in which the support liner 13 is wider than the facestock 11. In an embodiment, the micro tear-cuts 20 are perpendicular to the longitudinal edges of the polymeric tape 10, though other transverse relations may be used as well, such as between 30 degrees and 150 degrees from the longitudinal edges depending of the end-use cutting angle requirements. Therefore, angled cuts 20 may also be used. As another possibility, the micro tear-cuts 20 may cut through only the facestock 11, only the support liner 13, or both. The micro tear-cuts 20 may be straight lines, as an example. However, other shapes may be used for the micro tear-cuts 20, such as arrow shape, dots, semi-circle, square, rectangle, triangle, polygon, atypical, non-symmetrical, etc.

FIGS. 2A to 2D may not be to scale, being instead provided to illustrate the depth, location and/or orientation of the micro tear-cuts 20. For example, the micro tear-cuts 20 may be closer to one another, e.g., as low as 0.7 mm of spacing along the longitudinal edge, and/or as high as 10 mm (though the step may be outside of this range), but in an embodiment at most 6.5 mm. This may be referred to as the step between cuts 20. Moreover, micro tear-cuts 20 may be distributed at a regularly spacing along the length L of the polymeric tape 10, not just at the two discrete locations of FIGS. 2A to 2D, i.e., the step may be constant or may vary.

The polymeric tape 10 may be a length of tape, or may come in a roll as well. The polymeric tape 10 provides a user the possibility of conveniently tearing the desired length of the tape 10 by the user, because of the presence of the tear-cuts 20 all along the tape 10. When a user applies a tearing or shearing force, the tear cuts 20 define tear weaknesses along the longitudinal edges of the polymeric tape 10, which prevent the excessive stretch, and guide a tear along a path initiated by one of the micro tear-cuts 20. Whether the tear-cuts 20 are in the facestock 11 and/or the liner 13 (if present), the tear line of a segment of the tape 10 will be relatively clean in comparison to a similar tape but without the tear-cuts 20.

The method for using the polymeric tape 10 may include unrolling the polymeric tape 10 from a roll, if in a roll; applying a tearing force at a desired length of the polymeric tape 10, which tearing force will propagate in the facestock 11 and/or liner 13; adding information on the information-receiving facestock 11 of the torn segment of the polymeric tape 10; removing the support liner 13 from the torn segment of the polymeric tape 10 to expose an adhesive surface; and/or pressing the adhesive surface of the polymeric tape 10 against an object. These steps may be achieved in any particular order. In case of a linerless tape, such as a self-wound tape, a step of removing the support liner would be omitted and the tearing of the adhesive coated tape facestock can be achieved through initiating a cutting through a tear-cut and proceeding to applying the adhesive facestock to a surface by pressing tape to against an object.

One purpose of the polymeric tape 10 is to facilitate the manual tearing or cutting of a polymer tape optionally on a support liner which otherwise is difficult because of the nature of the polymer that will stretch or be rigid enough to resist to tear. The micro tear-cuts 20 in the polymeric material of the facestock 11 and/or the support liner 13 will allow an initiation of a break on the edges of the tape facestock and support liner (if present) and the break (e.g., tear strip) will continue through the polymer of the facestock 11 and/or the support liner 13.

In an embodiment, the tear-cuts 20 may be torn in the support liner 13 as a first step to allow the facestock 11 to be peeled off the liner 13 without tearing the facestock 11. In another embodiment, the support liner 13 may have slits extending widthwise to facilitate the peeling off.

Figure 3A:
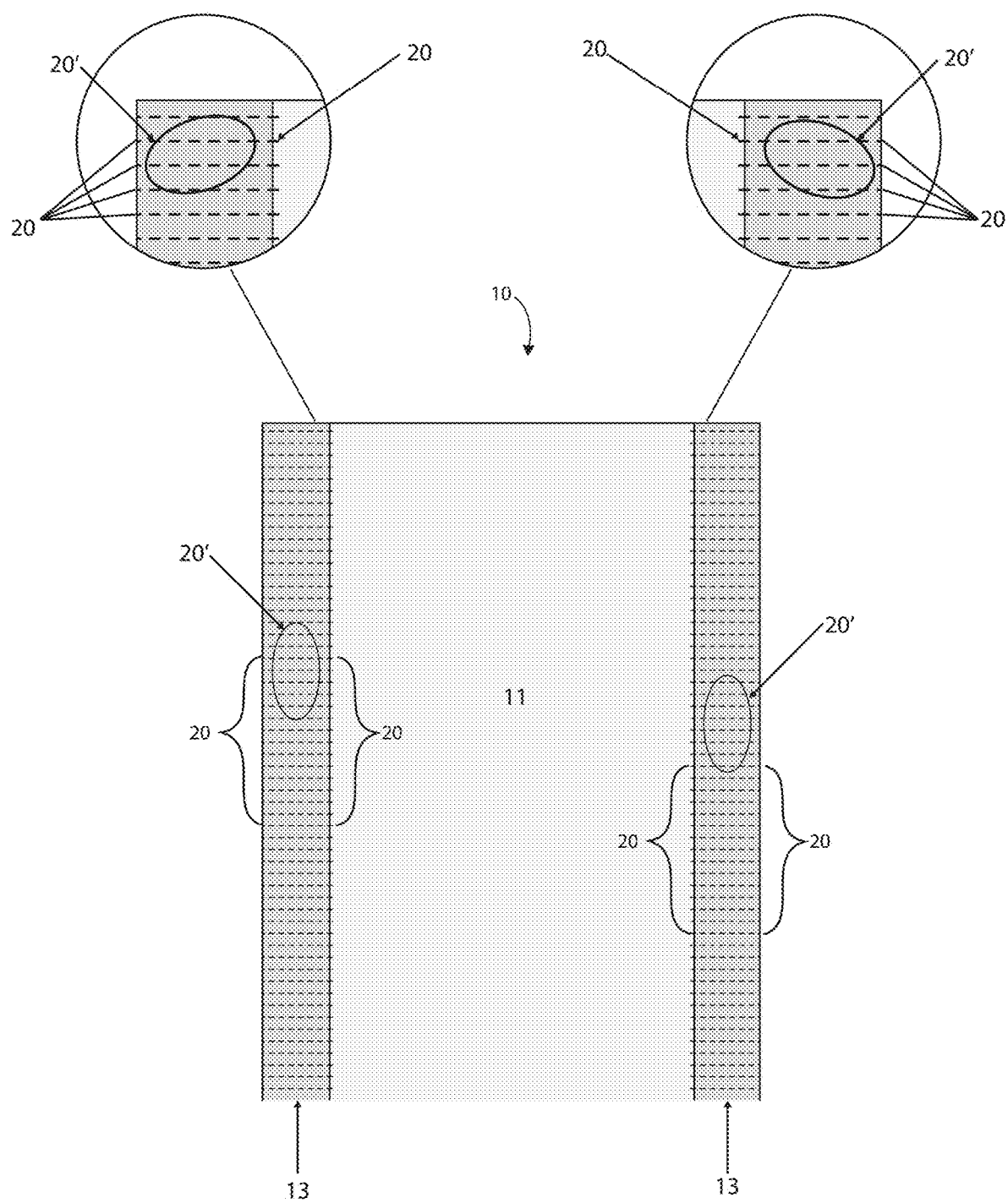
FIGS. 3A-3D are face views of the of the polymeric tape in accordance with embodiments of the present disclosure.
Figure 3B:
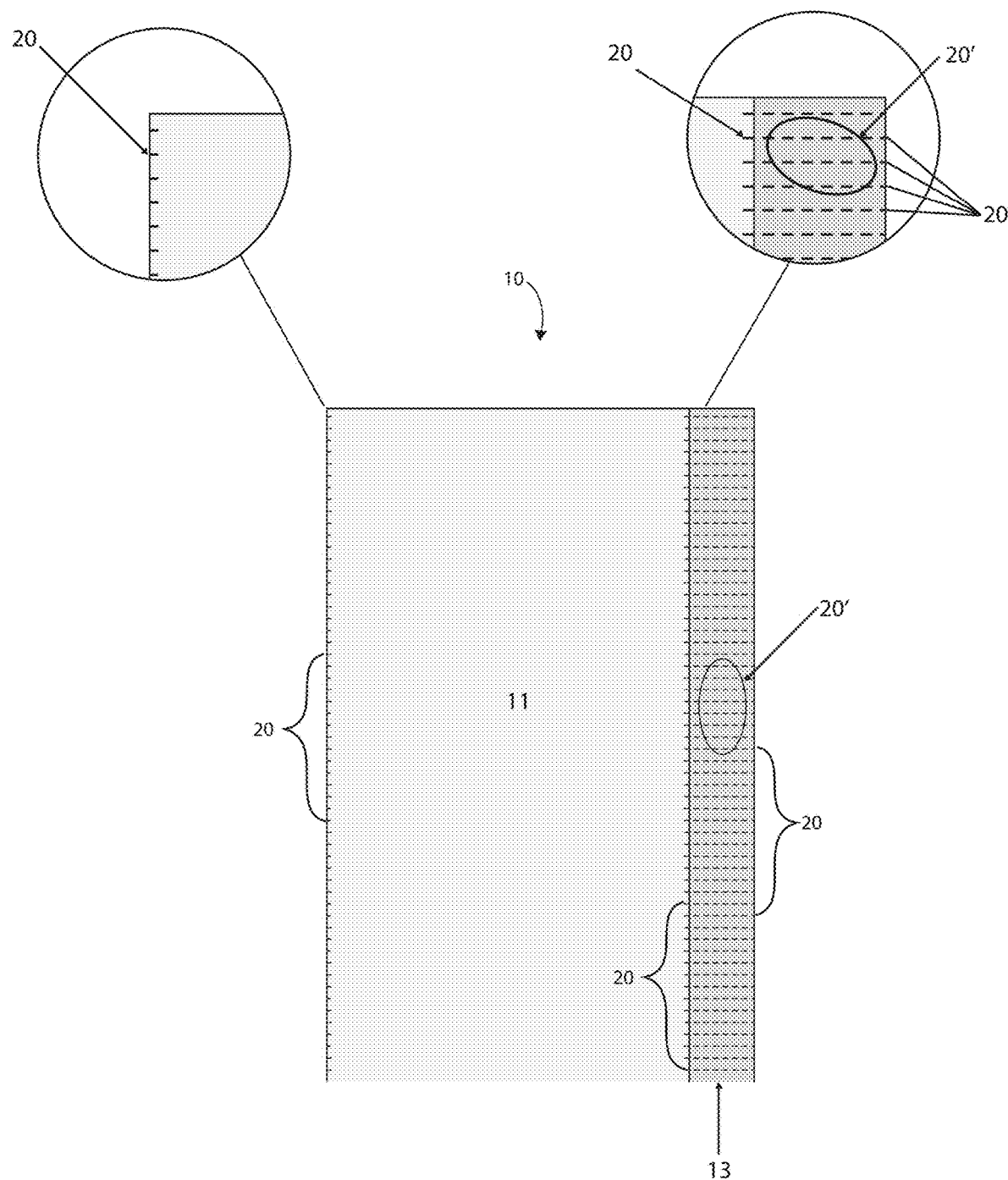
Figure 3C:
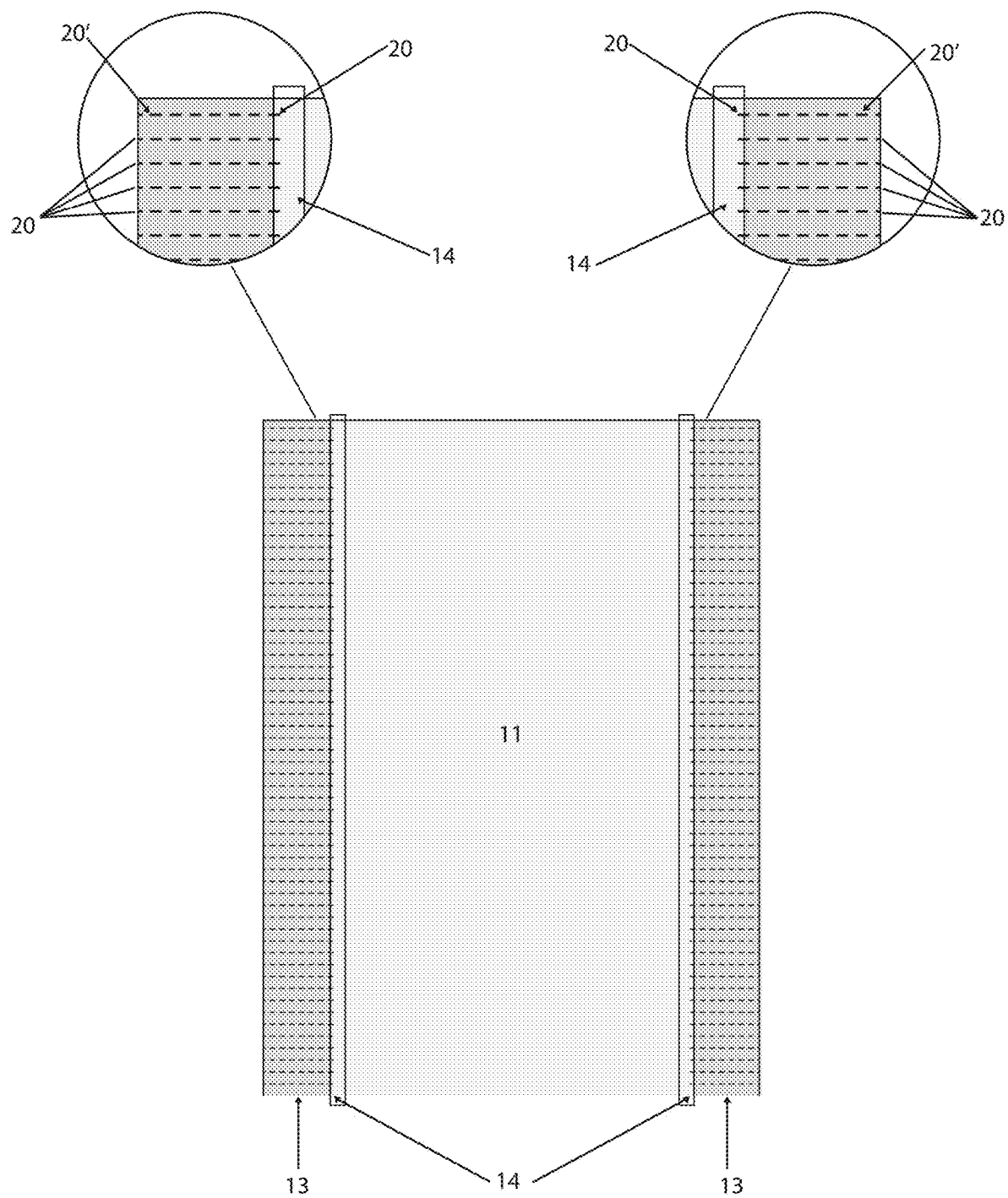
Figure 3D:
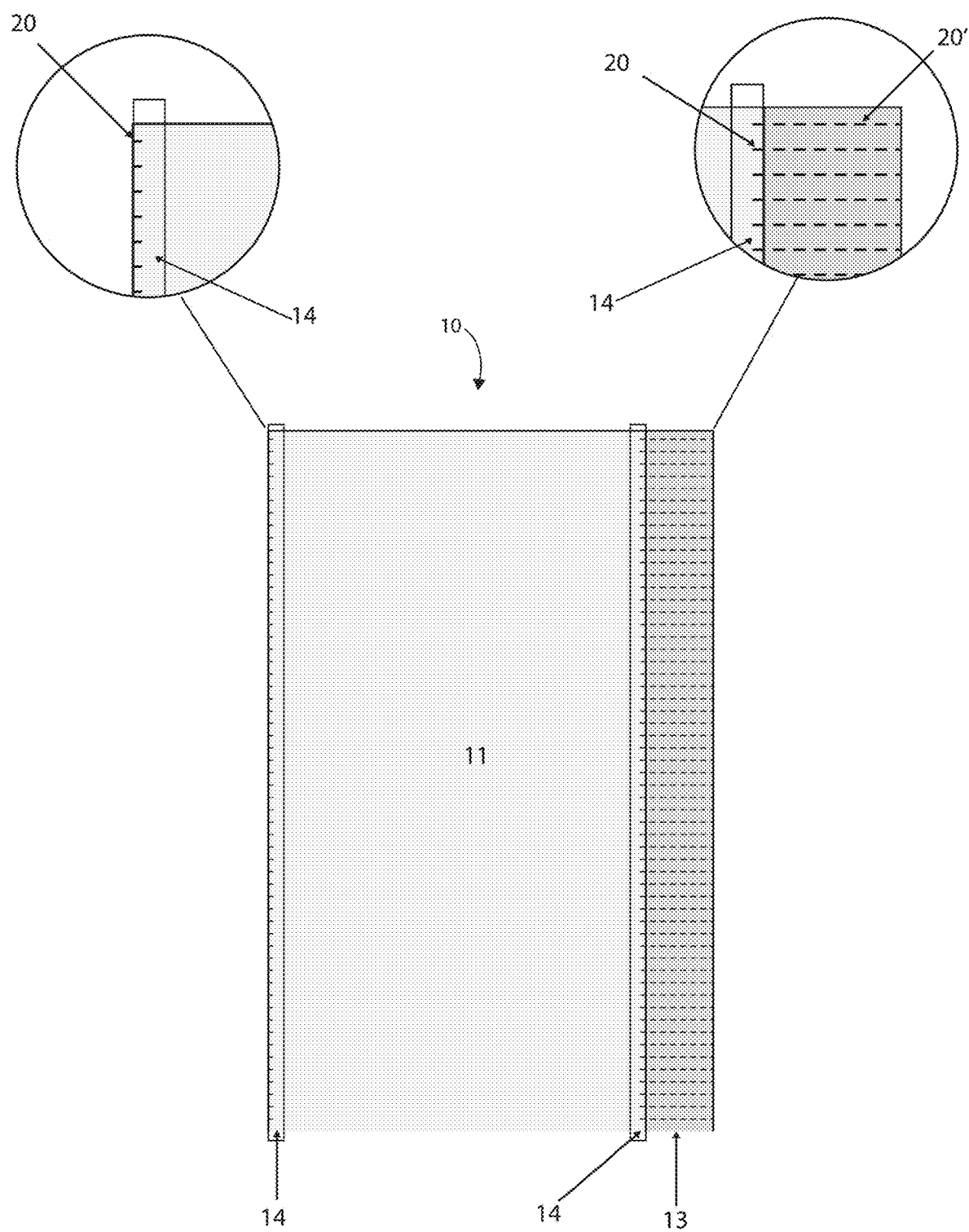
Figures 4A, 4B:
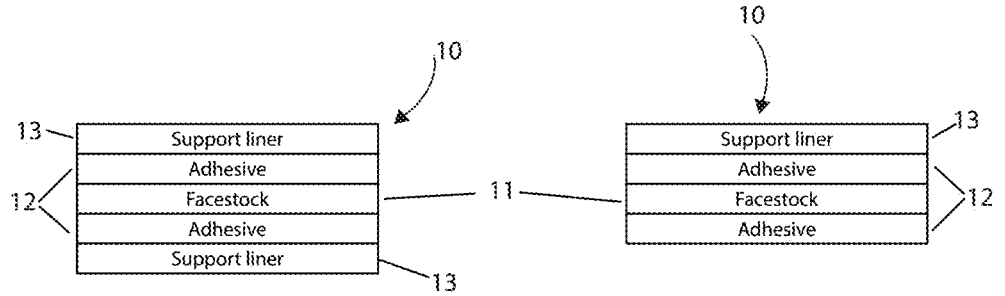
FIGS. 4A-4F are schematic sectional views of the polymeric tape in accordance with embodiments of the present disclosure.
Figures 4C, 4D:
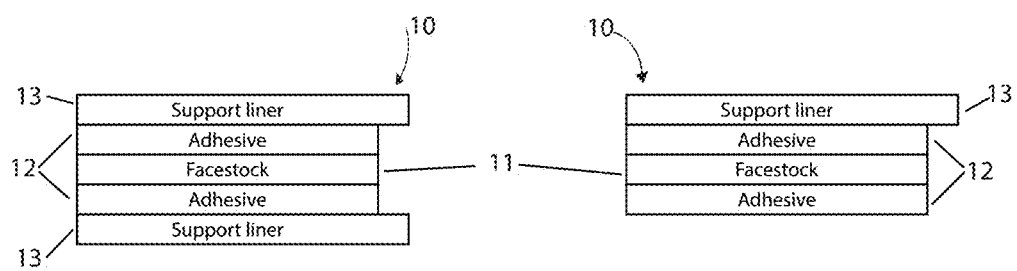
Figures 4E, 4F:
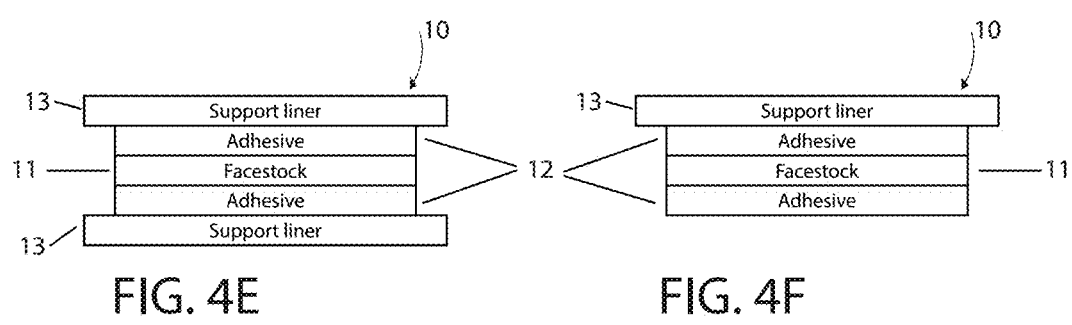

By way of further examples, FIGS. 3A to 3D show different embodiments of the polymeric tape 10 of the present disclosure. In FIG. 3A, the polymeric tape 10 of FIG. 1B is shown, with the micro-tear-cuts 20 extending from the longitudinal edges of the support liner 13 and into the lateral edges of the facestock 11. In FIG. 3B, the polymeric tape 10 of FIG. 10 is shown, with the micro-tear-cuts 20 extending from the longitudinal edges of the support liner 13 and into the lateral edges of the facestock 11 on one side, and with the micro-tear-cuts 20 extending concurrently from both the longitudinal edges of the facestock 11 and support liner 13 on the other side. In FIG. 3C, the polymeric tape 10 of FIG. 1D is shown, with the micro-tear-cuts 20 extending from the longitudinal edges of the support liner 13 and into the lateral edges of the facestock 11. In FIG. 3D, the polymeric tape 10 of FIG. 1F is shown, with the micro-tear-cuts 20 extending from the longitudinal edges of the support liner 13 and into the lateral edges of the facestock 11 on one side, and with the micro-tear-cuts 20 extending concurrently from both the longitudinal edges of the facestock 11 and support liner 13 on the other side. The micro tear-cuts 20 may be straight lines, as an example or plurality of cuts interrupted by uncut areas such as micro-perforations, as exemplified in FIGS. 6C and 6D. Other shapes may be used for the micro tear-cuts 20, such as arrow shape, dots, semi-circle, square, rectangle, triangle, polygon, atypical, non-symmetrical, etc. The micro-perforations form tear strips, that may or may not be aligned with the micro tear-cuts 20.

In other embodiments, shown in FIGS. 4A to 4F, the polymeric tape 10 might have an adhesive layer 12 coated on both the underside and upper side of the facestock 11. Such a tape 10 with two layers of adhesive 12 may be referred to as double-sided tape or double-sided mounting tape. In an embodiment, the double sided tape may have static cling capabilities on one side or both sides, and this may be regarded as an adhesive, for the sake of the present disclosure. Such double-sided tape 10 may or may not have a support liner 13 on one or both sides of the tape or might not comprise a support liner(s) applied on the underside and/or upper side adhesive layers 12. FIGS. 4A to 4F show different configurations with the support liner 13 being the same width or wider than the facestock 11. The various configurations of micro-tear cuts 20 described herein apply to the double-sided tape 10. The micro tear-cuts 20 (including perforations) may be on one or both liners 13, when the tape 10 has two liners 13. The double-sided tape 10 may come in a roll.

Figures 5A, 5B:
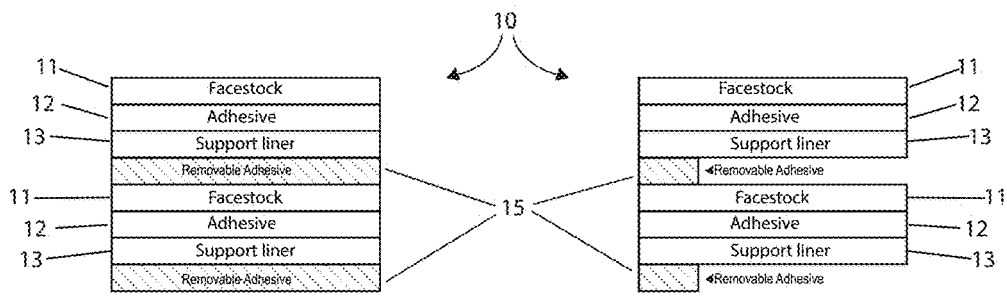
FIGS. 5A-5O are schematic sectional views of the polymeric tape in accordance with embodiments of the present disclosure.
Figures 5C, 5D:
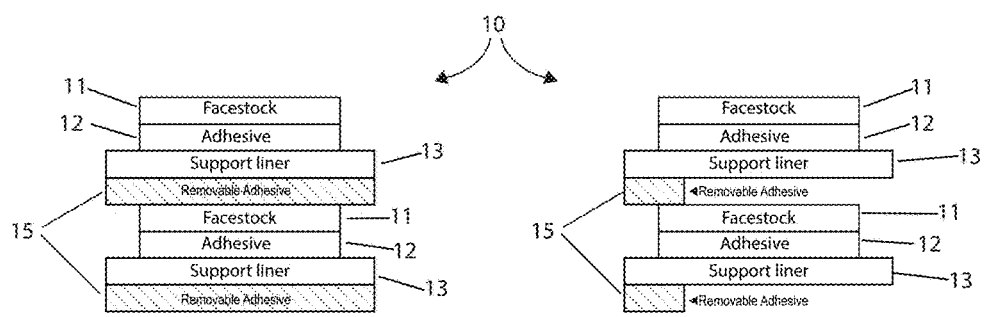
Figures 5E, 5F:
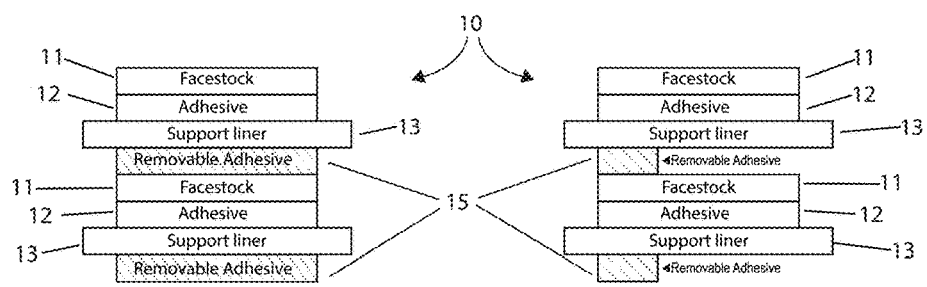
Figures 5G, 5H:
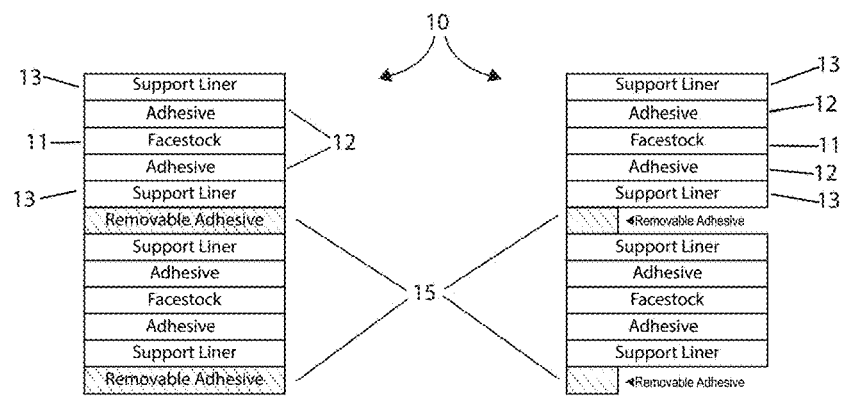
Figures 5I, 5J:
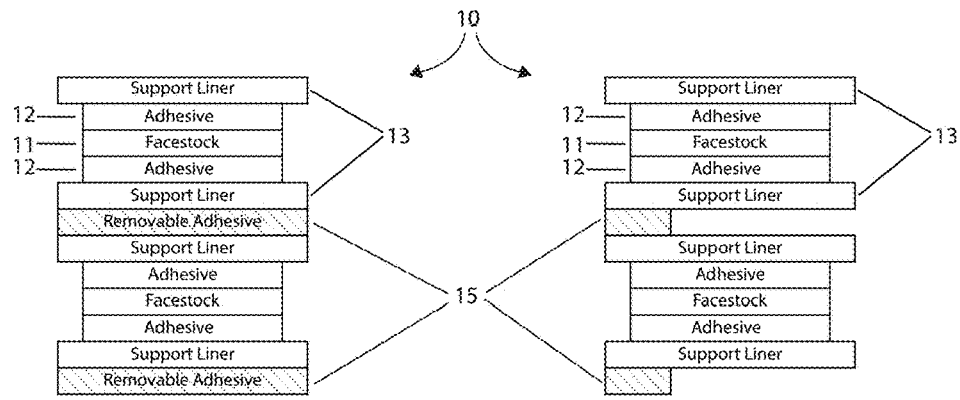
Figures 5K, 5L:
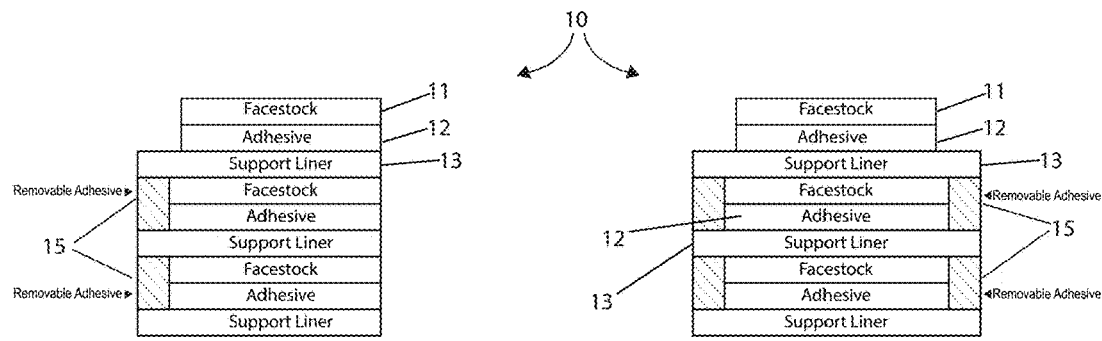
Figures 5M, 5N:
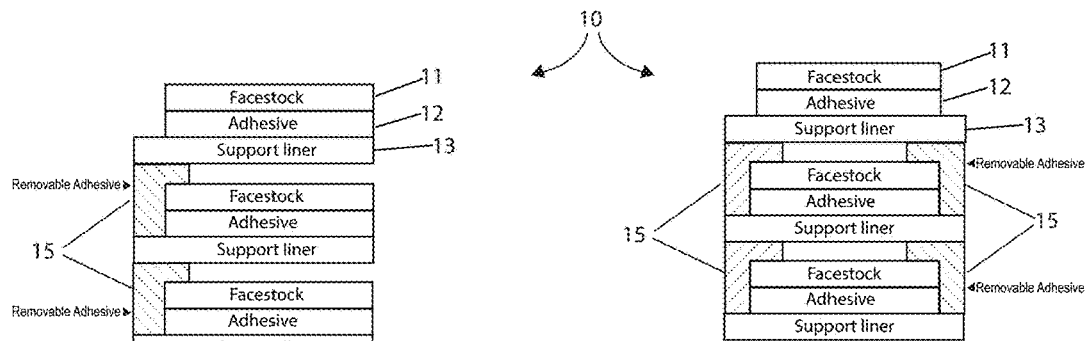
Figure 5O:
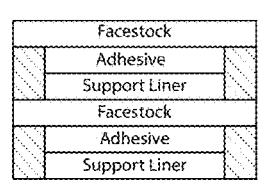

As the tape 10 in its various embodiments may come in a roll, it is contemplated to provide a layer or strip 15 of adhesive to assist the roll in maintaining its coiled shape, for instance for the roll not to unwind or cone axially. FIGS. 5A to 5J show various embodiments of configurations of the tape 10 described above, with the layer or strip 15 of such adhesive. Therefore, reference numerals are in accordance with those of the preceding figures. In FIGS. 5A to 5N, there are shown two cross-sections of the tape 10, i.e., one on top of the other, in similar fashion to the arrangement of the tape 10 in a roll, the tape 10 being rolled on itself. The layer or strip 15 of adhesive may be between the facestock 11 and/or support liner 13, etc. In an embodiment, the adhesive of the layer or strip 15 is a low tack adhesive that may be removable and/or repositionable. In another embodiment, the adhesive of the layer or strip 15 is a static cling. In another embodiment, the adhesive of the layer or strip 15 is a coating and/or a varnish that has a property to prevent slippage and unfolding of the coils of the tape. The location of the strips 15 may vary as well, as it may be more central, etc. The location to the left-hand side (e.g., FIG. 5B) is shown as an example.

Figure 6A:
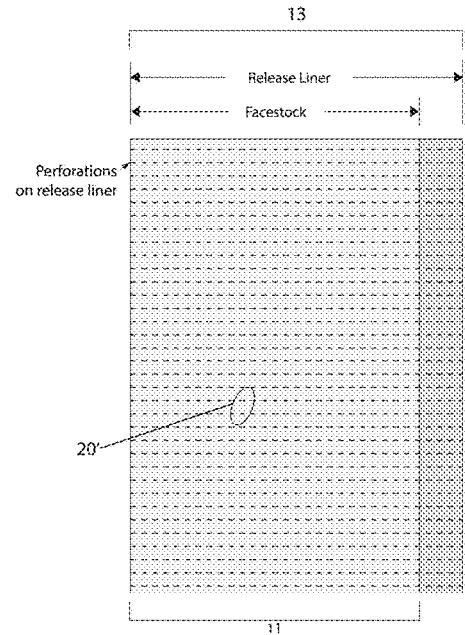
FIGS. 6A-6E are schematic rear views of the polymeric tape with additional perforations in a support liner.
Figure 6B:
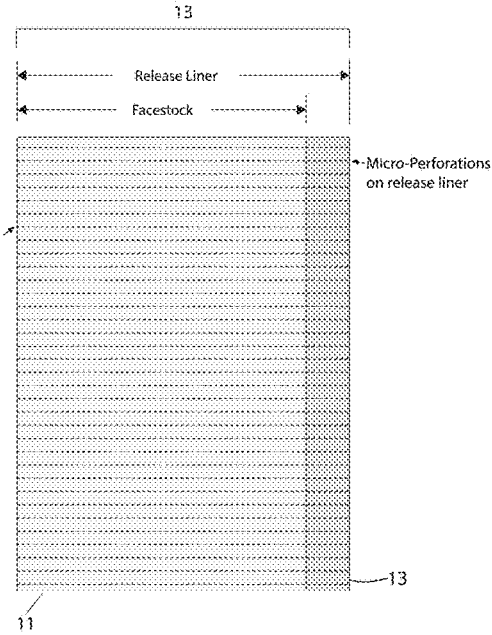
Figure 6C:
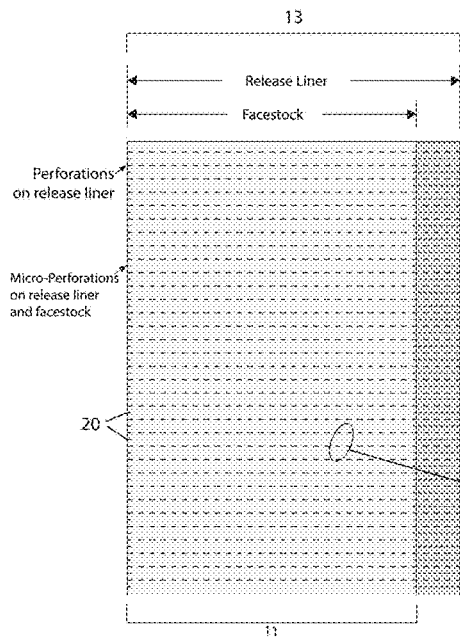
Figure 6D:
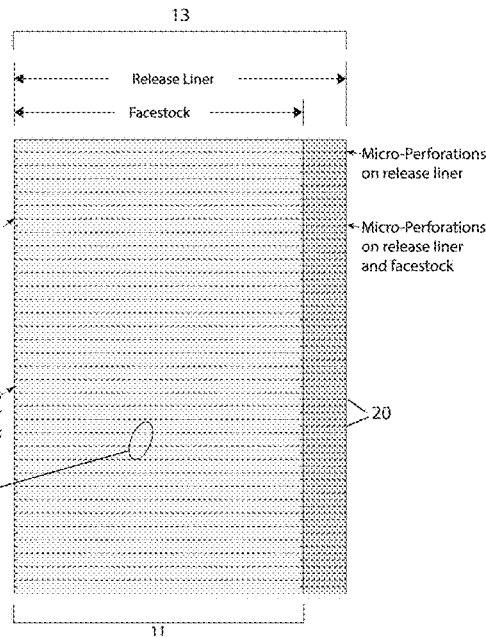
Figure 6E:
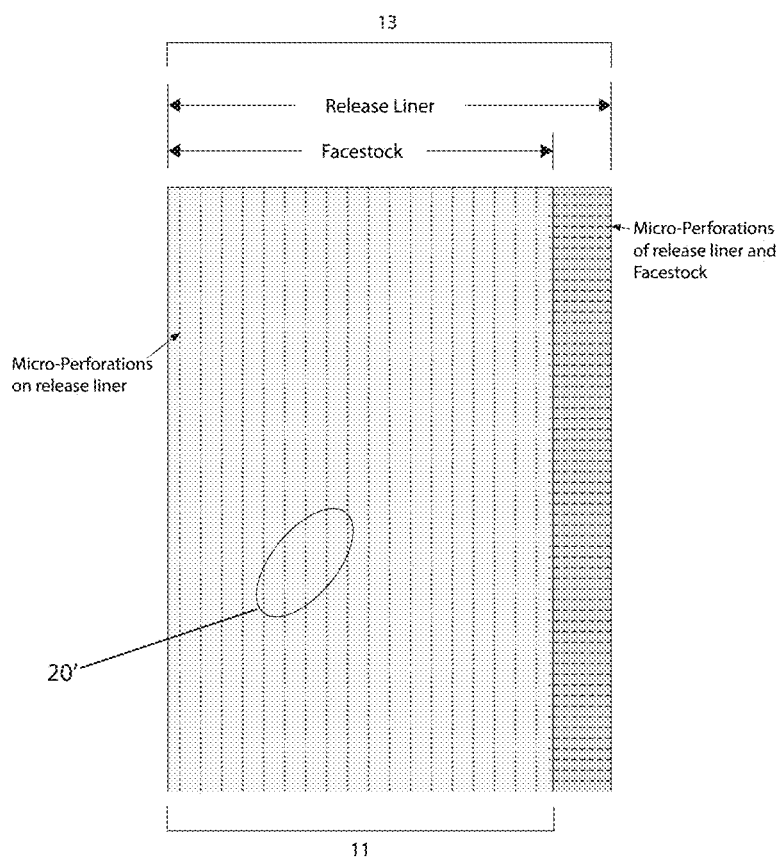

In another embodiment, it is contemplated to provide additional perforations 20' in the liner 13 only, as shown in FIGS. 6A to 6E. Such additional back-side perforations 20' are for helping directional cut initiated with the micro tear-cuts 20 so that the resulting cut segments of the tape 10 are more straight. The views in FIGS. 6A-6E are rear views and would only show the liner 13 (the facestock 11 being hidden). For clarity though, the demarcation of the facestock 11 is shown. FIGS. 6C and 6D show that there may be an intermittence of perforations 20', known as tear-strips as well, extending up to the facestock 11 (as in FIGS. 2C and 2D), while others extend from side to side of the support liner 13. As shown in FIG. 6E, the perforations 20' may extend in the longitudinal direction in the support liner 13, instead of extending widthwise as in FIGS. 6A to 6D.

The invention claimed is:

1. A tape roll comprising:
   a tape including at least a facestock extending lengthwise,
   an adhesive layer on a first surface of the facestock,
   a support liner releasably adhered to the adhesive layer such that the support liner covers all of the adhesive layer widthwise, wherein the tape is wound into a roll; and
   a layer of adhesive being provided on at least one lateral end face of the roll on edges of the facestock and of the support liner, the layer of adhesive being separate from said adhesive layer.

2. The tape roll according to claim 1, wherein the layer of adhesive defines at least one line on the lateral end face extending from a center to a circumference of the tape roll.

3. The tape roll according to claim 1, wherein the support liner is wider than the facestock such that the support liner extends beyond at least one of the at least one longitudinal edge of the facestock widthwise.

4. The tape roll according to claim 1, wherein the tape is a double-sided tape having another adhesive layer on a second surface of the facestock and another support liner releasably adhered to the other adhesive layer.

5. A tape comprising:
   a pair of support liners, the support liners made of a polymer, an adhesive layer between the pair of support liners, the support liners being releasably adhered to the adhesive layer such that the support liners cover all of the adhesive layer widthwise, and tear-cuts formed into at least one of longitudinal edges of at least one of the support liners of the pair and extending inwardly, the tear-cuts being provided all along the at least one of the longitudinal edges of the at least one of the support liners.

6. A polymeric tape comprising:

a facestock extending lengthwise, an adhesive layer only on a first surface of the facestock, a support liner releasably adhered to the adhesive layer such that support liner covers all of the adhesive layer widthwise, the support liner made of a polymer base, and tear-cuts provided all along at least one of longitudinal edges of the polymeric tape, the tear cuts including a first plurality of tear cuts formed into and extending inwardly from a first longitudinal edge of the support liner, wherein the first plurality of tear-cuts penetrates widthwise into the support liner by a first penetration distance greater than a second penetration distance of the tear-cuts into the facestock.

7. The polymeric tape according to claim 6, wherein the tear-cuts include a second plurality of tear-cuts formed in the facestock, the second plurality of tear-cuts aligned with the first plurality of tear-cuts.

8. The polymeric tape according to claim 6, wherein the support liner is wider than the facestock and includes a lateral edge portion which extends beyond a first longitudinal edge of the facestock widthwise, and wherein the first plurality of tear-cuts extends inwardly from the first longitudinal edge of the support liner transversally through the lateral edge portion and into the first longitudinal edge of the facestock.

9. The polymeric tape according to claim 6, wherein adjacent tear-cuts are spaced apart by at most 6.5 mm.

10. The polymeric tape according to claim 6, wherein adjacent tear-cuts are spaced apart by a distance ranging from 1.28 mm to 3.47 mm.

11. The polymeric tape according to claim 6, wherein the polymeric tape is wound into a roll, with a layer of adhesive being provided on at least one lateral end face of the roll.

12. The polymeric tape according to claim 6, wherein the first plurality of tear cuts are at an angle ranging between 30 degrees and 150 degrees relative to the first longitudinal edge of the support liner.

13. The polymeric tape according to claim 6, wherein the tear-cuts of the first plurality of tear-cuts penetrate into the support liner by 0.001 mm to 10.00 mm.

14. The polymeric tape according to claim 6, wherein the tear-cuts of the first plurality of tear-cuts penetrate into the support liner by 0.001 mm to 2.00 mm.

15. The polymeric tape according to claim 6, wherein the tear-cuts are on both longitudinal edges of the support liner.

16. The polymeric tape according to claim 6, wherein the tearing force required to initiate the tearing is at least 10% less than the tearing force required to initiate the tearing of the identical tape without tear-cuts.

17. The polymeric tape according to claim 6, wherein the support liner is entirely made of polymer.

18. The polymeric tape according to claim 6, wherein the support liner has a release coating on the polymer base.

* * * * *